June 11, 1946.                C. H. LITTLEFIELD                2,401,946
               COMPOSITE RESILIENT HEELS AND METHOD OF MAKING THEM
                        Filed Sept. 16, 1943            2 Sheets-Sheet 1
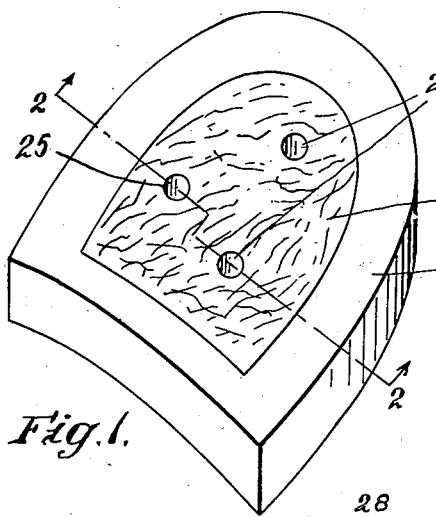
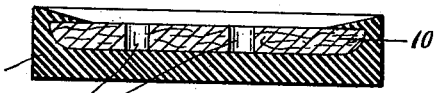
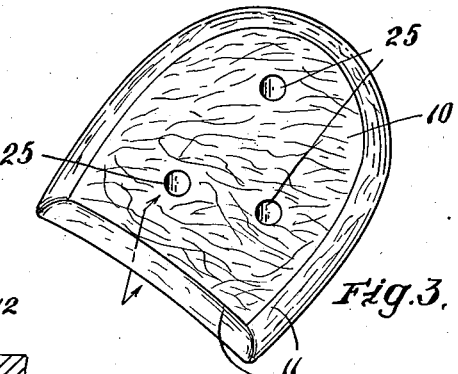
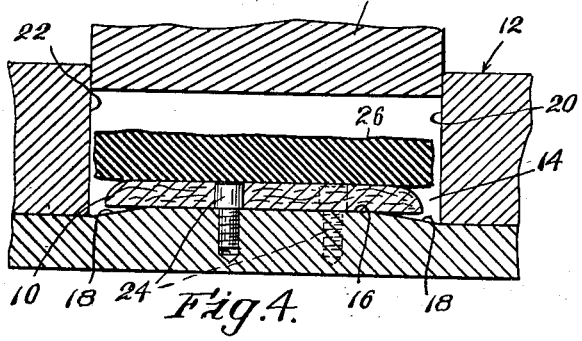
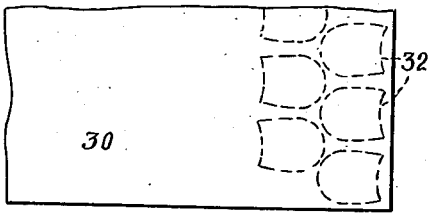
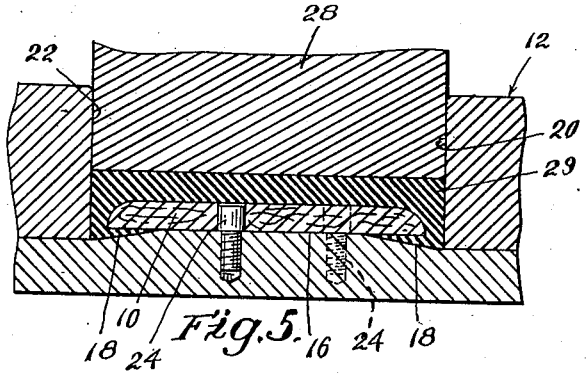
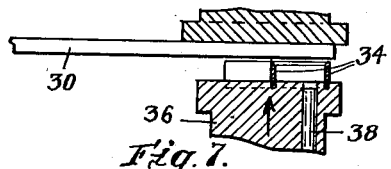
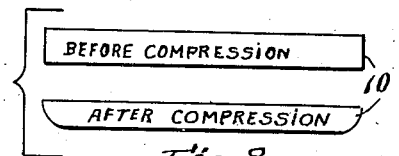
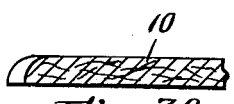
Inventor.
Charles H. Littlefield
By T. T. Greenwood
            Atty.

June 11, 1946.  C. H. LITTLEFIELD  2,401,946
COMPOSITE RESILIENT HEELS AND METHOD OF MAKING THEM
Filed Sept. 16, 1943  2 Sheets-Sheet 2
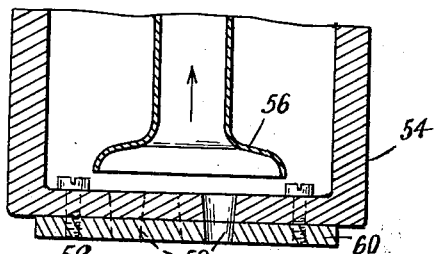
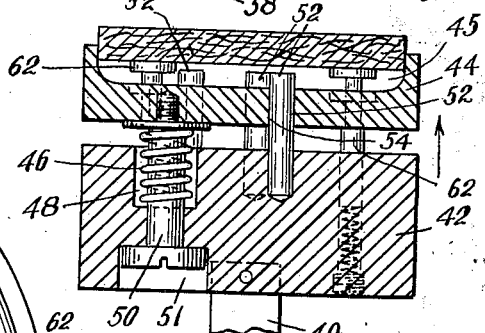
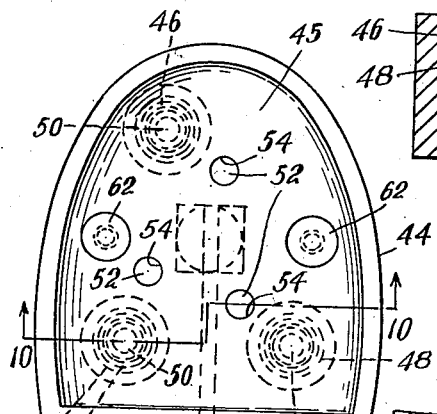
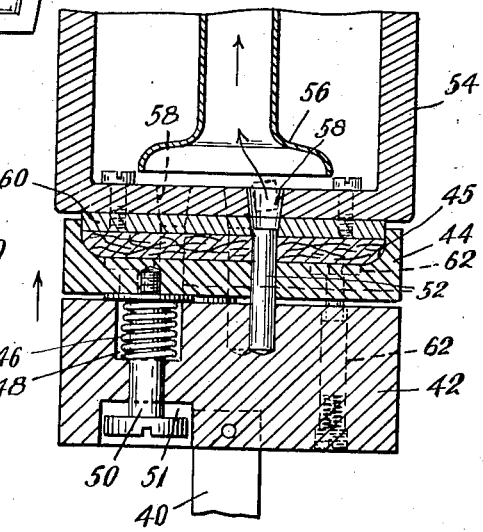
Inventor.
Charles H. Littlefield
By T. T. Greenwood
Atty.

Patented June 11, 1946

2,401,946

UNITED STATES PATENT OFFICE 2,401,946

COMPOSITE RESILIENT HEEL AND METHOD OF MAKING IT

Charles H. Littlefield, Auburn, Maine

Application September 16, 1943, Serial No. 502,610

7 Claims. (Cl. 12—42)

This invention relates to improvements in resilient heels for boots and shoes, and more particularly to an improved core for a resilient heel body of rubber or the like and to the method of making the core and combining it with the resilient heel body.

It has been proposed heretofore to provide composite heels having a resilient rubber body and a core of less yieldable material at the attaching surface of the composite heel, the core being relied upon to provide a substantially non-yielding surface in the midst of the rubber against which the heads of the attaching nails may be seated or, in some cases, metal inserts have been imbedded in the rubber in spaced relation to the core and the nail heads engage the inserts.

So far as I am aware all of the prior heel cores which have stiffness and strength capable of stabilizing a rubber heel and of taking the stresses of the heel attaching nails have been cut from relatively hard and tough sheet materials and any subsequent bevelling or rounding of edges has involved removal of material by a separate operation. Also the holes for receiving the locating pins of a vulcanizing press have been formed in the hard and tough blank which requires expensive punches and the piercing of the hard material frequently deforms the blank in the regions of the holes and necessarily introduces inequalities of density in the blanks.

My invention has among its objects to simplify the procedure and to reduce the cost of producing heel cores and also to provide an improved product both as regards the core and the composite heel embodying the core. I propose to employ for the cores a fibrous sheet material which can be manufactured according to well known and usual paper making processes and on ordinary paper making machines. Preferably the fibrous sheet will have substantial thickness as it comes from the paper making machine such as ¼" of thickness of relatively loosely matted fibre, the sheet being otherwise as large or as small as may be desired. Such a sheet according to the invention can be of a nature permitting my core blanks to be dinked therefrom by one or more inexpensive dinking dies which can work singly but which preferably will operate in gangs to produce core blanks in quantity at small cost. The core blanks, dinked out of fibrous sheet material while the material is in condition to be cut by the inexpensive dinking die, subsequently are subjected to molding pressure in a press which is capable of condensing the core material at least 25% as from ¼" original thickness to $\frac{3}{16}$" condensed thickness. If desired a suitable bonding agent may be introduced into the core material prior to or during the treatment in the press. Also if desired mineral fibres may be combined with vegetable fibres in the paper making machine, the mineral fibres in such case having the function of preserving the sheet material against damage by the heat of the vulcanizing press. Also in the press the core is molded to provide a rounded edge adjacent the surface opposite that which will be exposed in the composite heel, and the holes for centering the core in the vulcanizing press are punched in the core while it is in the press and before maximum compression thereof so that the final compression occurs when the punch pins are within the holes and the density of the condensed core can be uniform throughout the core including the regions immediately adjacent to the punched holes.

The method of producing a heel core as herein described, the mechanism for practicing the method and the resulting heel core and composite resilient heel all constitute further objects of my present invention.

It is, moreover, my purpose and object generally to improve heel cores and composite heels and the method of producing them as compared with prior proposals.

In the accompanying drawings,

Fig. 1 is a perspective view of a composite resilient heel embodying features of my present invention, looking at the attaching face of the heel;

Fig. 2 is a cross sectional view on line 2—2 of Fig. 1;

Fig. 3 is a perspective view of one of my improved heel cores looking at that face of the core opposite the face which is exposed in Fig. 1;

Fig. 3a is a section taken on line 3—3 of Fig. 3.

Fig. 4 is a cross-sectional view through a usual vulcanizing and heel forming press showing one of my improved cores centered therein and having a cake of raw rubber resting on the core in position to be molded around the core;

Fig. 5 is a view similar to Fig. 4 showing the rubber cake molded around the core;

Fig. 6 is a plan view of a fragment of a fibrous sheet made on a paper making machine and having a dotted indication of how the core blanks may be dinked therefrom;

Fig. 7 is a vertical cross-sectional view through a dinking mechanism;

Fig. 8 shows edge elevations respectively of a dinked core blank before compression in the molding and forming press and after compression therein;

Fig. 9 is a vertical cross-sectional view through a condensing and molding press in which my dinked core blanks may be condensed and molded and also punched with the holes for centering the core in a vulcanizing press such as that of Figs. 4 and 5, the core blank being shown therein prior to inter-engagement of the dies;

Fig. 10 is a view similar to Fig. 9 showing the core blank completely condensed and molded; and Fig. 11 is a top plan view of the lower die of the press of Figs. 9 and 10.

Referring to the drawings, the composite heel of Figs. 1 and 2 has my improved core 10 embodied therein according to well known procedure in the rubber heel art, such as by means of an ordinary vulcanizing and heel forming press shown in Figs. 4 and 5. As represented, the press has a fixed mold form 12 whose cavity 14 has a bottom wall 16 which is horizontally plane except at marginal zones all around the cavity where the bottom wall inclines downwardly and outwardly as at 18 to the side walls 20 and 22 of the cavity. This bottom wall 16 has projecting vertically upward therefrom a series of pins 24 for engaging in holes 25 in the core for centering the core 10 in the cavity. The side walls 20, 22 define a cavity having the outline of a completed heel and having depth sufficiently greater than the over-all thickness of a heel so that a core 10 and a suitable cake 26 of raw rubber or the like may be arranged in the cavity as in Fig. 4, preparatory to movement of the compression die 28 which molds the rubber about the core as represented at 29 in Fig. 5 and as seen in the completed heel of Figs. 1 and 2. The heating means for vulcanizing the rubber in the press is not shown as this general type of forming and vulcanizing press is well known.

According to my invention the heel core 10 is made from fibrous sheet material which can be manufactured in a paper making machine by conventional paper making processes. A fragment of such a fibrous sheet is represented at 30 in Fig. 6 which also has a dotted indication at 32 of how the heel core blanks may be dinked from the sheet by relatively inexpensive dinking dies such as the dies 34 shown in Fig. 7. The dinking dies 34 preferably will be arranged as a gang so that a number of core blanks can be dinked from a sheet 30 in a single operation and while the sheet is in condition to be penetrated by the cutting dies. A represented in Fig. 7, the dinking dies are mounted for vertical reciprocation. The sheet 30 is fed between the dies and a board or block 36, which latter is movable toward and away from the dies to press the sheet 30 into position to be cut by the dies acting against the board 36. The dinked out blanks drop through the dies to a suitable collecting device below.

The feature whereby the core blanks are dinked out of a relatively loosely matted fibre sheet introduces economies not possible with prior methods. The dies can be inexpensive, yet effective. The sheet, for example, may be ¼" in thickness as it comes from the paper making machine and the core blanks are dinked therefrom while the sheet continues in condition capable of being easily penetrated by the dinking dies, as compared with sheets of wood and other relatively hard and tough sheet materials from which prior heel cores have been fashioned.

My improved heel core blanks, dinked out in substantially heel shape, are condensed in a molding press to impart needed stiffness and hardness to the ultimate heel cores. In Figs. 9 to 11, there is represented a molding press suitable for this purpose which may be embodied in a known type of heel seat forming machine having the upper element of the press stationary and the lower one movable into compressive relation thereto. The vertically reciprocable shaft 40 of the heel seat forming machine has carried at its upper end the movable unit of the press which comprises the body 42 on which is mounted the forming die 44 of the press. The die 44 normally is yieldably held in spaced relation to the body 42 by means of coil springs 46 which engage at their lower ends on the bottoms of recesses 48 in the body and at their tops against the underside of the die 44, the springs being loosely threaded on bolts 50 which extend slidably through the body 42 and have their upper ends threaded into the die 44. The heads of the bolts 50 are movable in recesses 51 in the underside of the body 42, thus limiting the upward movement of the die 44 under the urge of the springs 46.

Punch pins 52 upstand from the body 42 and extend slidably through holes 54 in the die 44, their tops normally standing within the die cavity 45 so that as the core blank is forced into the cavity the punch pins 52 will punch holes through the blank before the blank has been condensed appreciably by the molding pressure. In the drawings three such punch pins 52 are shown and three of the recesses 48 with springs 46 therein.

The upper forming member 54 of the press is shown as hollow and has suction means 56 therein for removing the punched out portions of the cores, the punch pins 52 extending through the cores 10 and into the holes 58 in the face of the forming member 54. Preferably a steel facing plate 60 is provided on member 54 having an outline complementary to the die cavity 45 so that when a core blank is inserted in the cavity and the die 44 is moved upward the face plate 60 first engages the core blank pushing it somewhat into the die cavity 45. However, before any substantial compression of the blank occurs springs 46 yield to permit the body 42 to project the punch pins 52 into the blank after which both 42 and 44 move upward as a unit to complete the punching and to mold the blank in the cavity 45 with simultaneous condensing of the material of the blank and molding of the edge of the blank which is adjacent to the bottom cavity, as at 11 in Fig. 3. The core blank as previously stated initially may have a thickness of ¼" prior to being condensed and the same blank after it has been condensed and molded may have a thickness of $\frac{3}{16}"$. The ultimate compression occurs after the punch pins 52 are through the blank so that the molding pressure is applied while the pins are in position to have the material compressed around them as cores which insures uniformity of density of the ultimate product.

Preferably one or more ejecting means is provided for ejecting the condensed cores. Two such are illustrated, each being a spring pressed plunger 62 which normally projects downwardly when the dies move together and urge the formed core out of the cavity when the dies separate.

If desired a suitable bonding agent may be impregnated into the dinked out core blanks prior to or during the condensing and molding of them in the forming press, although the natural substances ordinarily associated with vegetable fibres can serve satisfactorily as a bonding agent. Also it may be desirable in some cases to employ mineral fibres in conjunction with the vegetable fibres in order to provide a product which can better withstand the extreme heat of the vulcanizing press, the mineral fibres being relied upon to protect the vegetable fibres. The mineral fibres, of course, would be combined in the paper making machine so that the initial uncompressed sheets would embody both the vegetable fibres and the mineral fibres. Asbestos fibre is suggested as one mineral fibre which may be combined advantageously with vegetable fibres. If a bonding substance is to be added to the dinked out core blanks the selected substance should be one which can successfully resist the extreme heat of the vulcanizing. Various well known bonding agents meeting the requirements of providing an effective bond between the fibres and also capable of resisting extreme heats are well known and available at reasonable cost.

I claim as my invention:

1. The method of making cores for resilient heels comprising the steps of providing a compressible core blank of moldable fibrous sheet material and punching a plurality of locating holes therein, followed by a condensing of the core blank while the punches continue in the punched holes, including a molding of the edge of the blank all around the blank to provide the edge with curvature extending in direction from one face to the opposite face of the core.

2. The method of making cores for resilient heels comprising the steps of providing a compressible core blank of fibrous sheet material and punching a plurality of locating holes therein followed by a condensing of the core blank while the punches continue in the punched holes including a molding of the edge of the blank all around the core to provide the edge with a curvature approximating a 90° arc extending from one face of the core to the opposite face.

3. The method of making heat resistant cores for resilient heels which consists in providing a compressible core blank comprising a sheet of vegetable fibre and mineral fibre and punching a plurality of locating holes therein, followed by a condensing of the core blank while the punches continue in the punched holes, including a molding of the edge of the blank to provide at least a portion thereof with a curvature extending in direction from one face to the opposite face of the core.

4. Apparatus for making heel cores, comprising a press which is operable to receive a compressible core blank therein, closable to confine the blank, and further operable to compress the blank, means for opening and closing the press to receive and confine a blank and for further operating it to compress the blank, a punch operable subsequent to the confining of the blank and prior to appreciable compression thereof for punching a hole in the blank, said punch remaining in the hole during subsequent compression of the core blank, said press including a die of shape to mold an edge portion of the core with transverse curvature.

5. Apparatus for making heel cores, comprising a press having male and female dies of which the latter is adapted to receive a compressible core blank, means for moving the dies relatively toward each other to confine the compressible core blank therein and further toward each other to compress the core blank, a plurality of punch pins movable relative to the blank and operable to punch holes in the blank subsequent to the confining of the blank but prior to ultimate compression of the blank, said punch pins remaining in the holes during the ultimate compression of the core blank, and means at an edge of the female die for molding the corresponding edge of the core with transverse curvature.

6. Apparatus for making heel cores, comprising relatively movable male and female dies combining to provide a generally heel-shaped cavity within which a compressible core blank may be confined in substantially uncompressed condition and then compressed by relative movement of the dies toward each other, a plurality of punch pins extending loosely through the female dies and fixed relative thereto, and means providing for limited movement of the female die along the punch pins simultaneously with movement of the male die in the some direction while the core blank is confined between the dies thereby to punch holes in the core blank prior to compression of the blank, said punch pins remaining in the holes during ultimate compression of the core blank by continued movement of the male die after the limit of movement of the female die.

7. Apparatus for making heel cores, comprising relatively movable male and female dies combining to provide a generally heel-shaped cavity within which a compressible core blank may be confined in substantially uncompressed condition and then compressed by relative movement of the dies toward each other, a plurality of punch pins extending loosely through the female dies and fixed relative thereto, and means providing for limited movement of the female die along the punch pins simultaneously with movement of the male die in the same direction while the core blank is confined between the dies thereby to punch holes in the core blank prior to compression of the blank, said punch pins remaining in the holes during ultimate compression of the core blank by continued movement of the male die after the limit of movement of the female die, and means for ejecting the compressed cores from the female die when the male die is retracted.

CHARLES H. LITTLEFIELD.